United States Patent [19]

Babel

[11] Patent Number: 5,130,625
[45] Date of Patent: Jul. 14, 1992

[54] CONTROL UNIT FOR PROGRAM CONTROLLED MACHINE TOOLS

[75] Inventor: Werner Babel, Pfronten, Fed. Rep. of Germany

[73] Assignee: MAHO Aktiengesellschaft, Fed. Rep. of Germany

[21] Appl. No.: 611,241

[22] Filed: Nov. 9, 1990

[30] Foreign Application Priority Data

Nov. 23, 1989 [DE] Fed. Rep. of Germany ....... 3938851

[51] Int. Cl.[5] ............................................. G05B 11/18
[52] U.S. Cl. ...................................... 318/560; 318/571;
318/572; 364/474.32; 364/474.27; 51/165.71;
51/165.77
[58] Field of Search ................ 318/560, 561, 568.13,
318/571, 573, 577, 560–630; 364/513,
474.01–474.29, 474.32; 51/131.1, 131.3, 165.77,
165.8, 165.82, 165.71, 165.75, 165.92, 165.87

[56] References Cited

U.S. PATENT DOCUMENTS

| | | | |
|---|---|---|---|
| 3,766,460 | 10/1973 | Hentz et al. | 318/571 |
| 4,623,778 | 11/1986 | Cullen et al. | 318/577 |
| 4,831,232 | 5/1989 | Andersson et al. | 318/577 |
| 4,831,316 | 5/1989 | Ishiguro et al. | 318/568.13 |

*Primary Examiner*—Paul Ip
*Attorney, Agent, or Firm*—Baker, Maxham, Jester & Meador

[57] ABSTRACT

This invention concerns a control unit for program-controlled machine tools with control circuits for the individual feed motors (20) of the moving machine parts (2) which are connected to the program control unit (34) and also contain at least one switching element (14) for manually switching on feed motors (20). In order to give the operator a feel for the respective operating process in manual operation, each control circuit according to this invention has at least one sensor (26, 42) for detecting a power parameter (I;M) of the respective feed motor (20). Furthermore, a brake gear (30 or 44) that is controlled by the output signals of the sensor (26; 42) is assigned to each switching element that is designed as a manually adjustable control element (14), whereby the braking device is actuated in proportion to the power parameters picked up by the sensors and it makes continued turning of the control element which is designed as a hand crank more difficult.

7 Claims, 2 Drawing Sheets

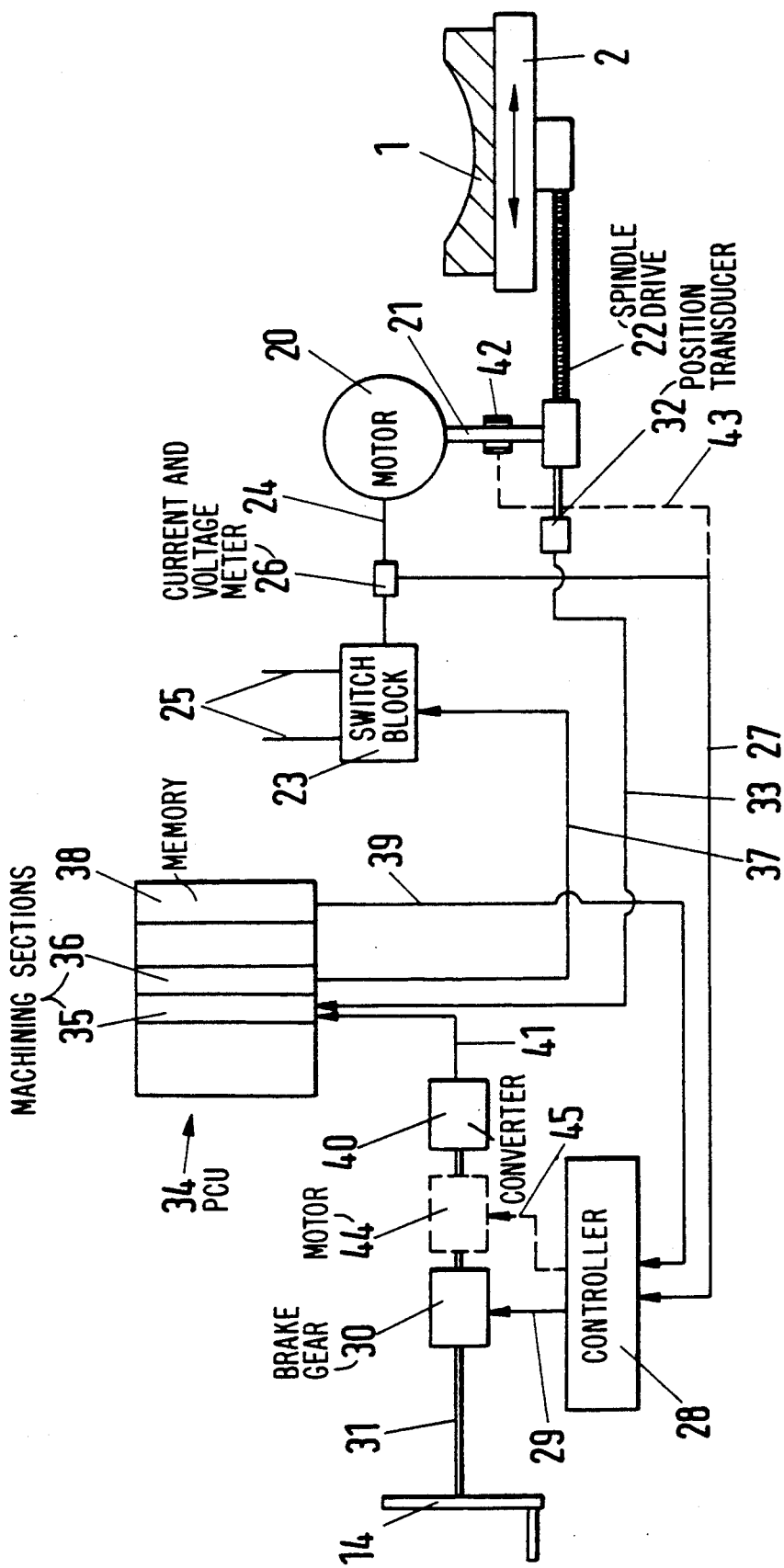

CONTROL UNIT FOR PROGRAM CONTROLLED MACHINE TOOLS

This invention concerns a control unit for program-controlled machine tools with control circuits for the individual feed motors of the moving mechanical parts that are linked to the program control and also contain switching elements for manually starting and stopping the feed motors.

Modern program-controlled machine tools permit complete automation of a wide variety of processing operations on complex workpieces using a variety of tools that are changed automatically. By eliminating the setup time required in the past for changing tools, for example, and by optimizing the feed rates, the cutting capacity of such complex machines is many times greater than that of traditional manually controlled machines. However, the prerequisite is careful formulation of programs in which all the movements and processes of the individual machine parts are stipulated in advance. Although there is often the possibility of writing such programs with computer assistance, a great expense in terms of highly qualified technical personnel is usually required to accomplish this.

In order to be able to carry out special machining operations with manual control as well, devices and measures for stopping the program control and switching to manual control are usually provided. In this case, the drive motors for the various machine parts, especially the feed motors for the workpiece table and the tool mount are operated, for example, by pressing buttons provided in the control panel and they are switched off again by releasing these buttons. Although this procedure can be carried out easily and rapidly, it leads to various problems which can result in machining defects on the workpiece. With the traditional manual operation of a simple machine tool, a skilled operator could estimate the load to be applied to the tool by judging the ease or difficulty in moving the hand cranks and could thus estimate the cutting performance. If the difficulty in turning the hand cranks increased excessively, the operator would slow down these rotating movements "by feel" and would thus also slow the feed movement in the respective axis, which would in turn result in a corresponding reduction in cutting performance and a reduction in the load on the tools. However, this possibility of determining the feed movements by feel and thus estimating the load on the tool can no longer be achieved with the machine tools discussed above which are normally program-controlled simply by turning the feed motors on and off by means of push buttons. By depressing these push buttons or adjusting these knobs, the respective feed motors can only be turned on and off but the operator does not obtain any information about the actual operating state of the respective feed motor with regard to performance. The operating state can be monitored only by visual observation of the tool acting on the workpiece. However, this possibility of visual monitoring is often limited, for example, by machining operations on the back side of the workpiece facing away from the operator, by an accumulation of machining fluid and shavings on the inside surface of the compartment window, by an unfavorable position of the operating control room, etc. These problems can have especially serious effects in the production of large female molds when the rough work is performed manually. In doing so, there is the danger that the end values of the respective axial feed which are determined by the shape of the finished female mold can be exceeded, which leads to irreversible defects in the workpiece.

SUMMARY OF THE INVENTION

The purpose of this invention is to create a control unit for program-controlled machine tools and machining centers that will overcome the disadvantages outlined above and will make it possible for the operator in to monitor and judge the machining operations "by feel" during manual operation.

This problem is solved according to this invention by the fact that each control circuit contains a sensor for detecting a performance parameter of the respective feed motor, and the switching elements of the control circuit are designed as manually adjustable control elements, e.g., as known type of hand cranks, and finally a brake gear that is controlled by the output signals of the sensor is assigned to the respective control element.

The control unit designed according to this invention makes it possible for the experienced operator to carry out special machining operations such as rough work in the production of female molds in the manner that is conventional with simple machine tools when operating with strict manual control. As soon as the performance parameter monitored by the sensor during one machining operation (e.g., the torque acting on the motor shaft) increases, the brake gear is activated accordingly and thus the ease with which the controlling element moves is decreased. Consequently, the operator must apply a greater physical force to achieve a further adjusting movement of the control element, i.e., in order to turn the hand crank further or the movement is slowed down. In this way the operator gets a feel for the work expended by the feed motor and thus for the cutting forces acting on the tool.

In order to be able to visually observe and monitor the progress of work by the machine tool through the window of the protective compartment even under unfavorable visual conditions, the control elements for manual control of the individual feed motors according to this invention are arranged on a separate control panel which can be set up, for example, on the machine stands by means of an articulated spar system and can be moved by the operator out of a suitable holding position into the operating position directly in front of the compartment window. In this case, all the control elements and hand cranks are easily accessible so the feed movements of the machine parts can be controlled with a high sensitivity in several axes without the operator having to interrupt observation of the machining processes.

In order to assure that the end positions of the machine parts which are determined by the finished shape of the workpiece are not exceeded with each machining movement during manual operation, another feature of this invention provides for the control circuits for manual operation of the drive motors to be linked to the program control unit such that operation of the feed motors is stopped by higher ranking control commands coming from the program control unit before reaching the end positions which are determined by the shape of the workpiece. For this purpose, the control circuits are provided with a data storage which may optionally be integrated into the program control and contains the data for the given end positions of the moving machine parts for each operating step and produces blocking signals for the feed motors before reaching this end position. According to an expedient design, the data for a three-dimensional curve that describes the surface of the finished workpiece can be kept on file in the memory.

BRIEF DESCRIPTION OF THE DRAWINGS

Additional details and advantages of this invention can be derived from the following description of a practical example on the basis of the figures which show the following:

FIG. 2 shows a schematic diagram of a circuit of the controlling system.

DETAILED DESCRIPTION OF THE INVENTION

Figure 1:
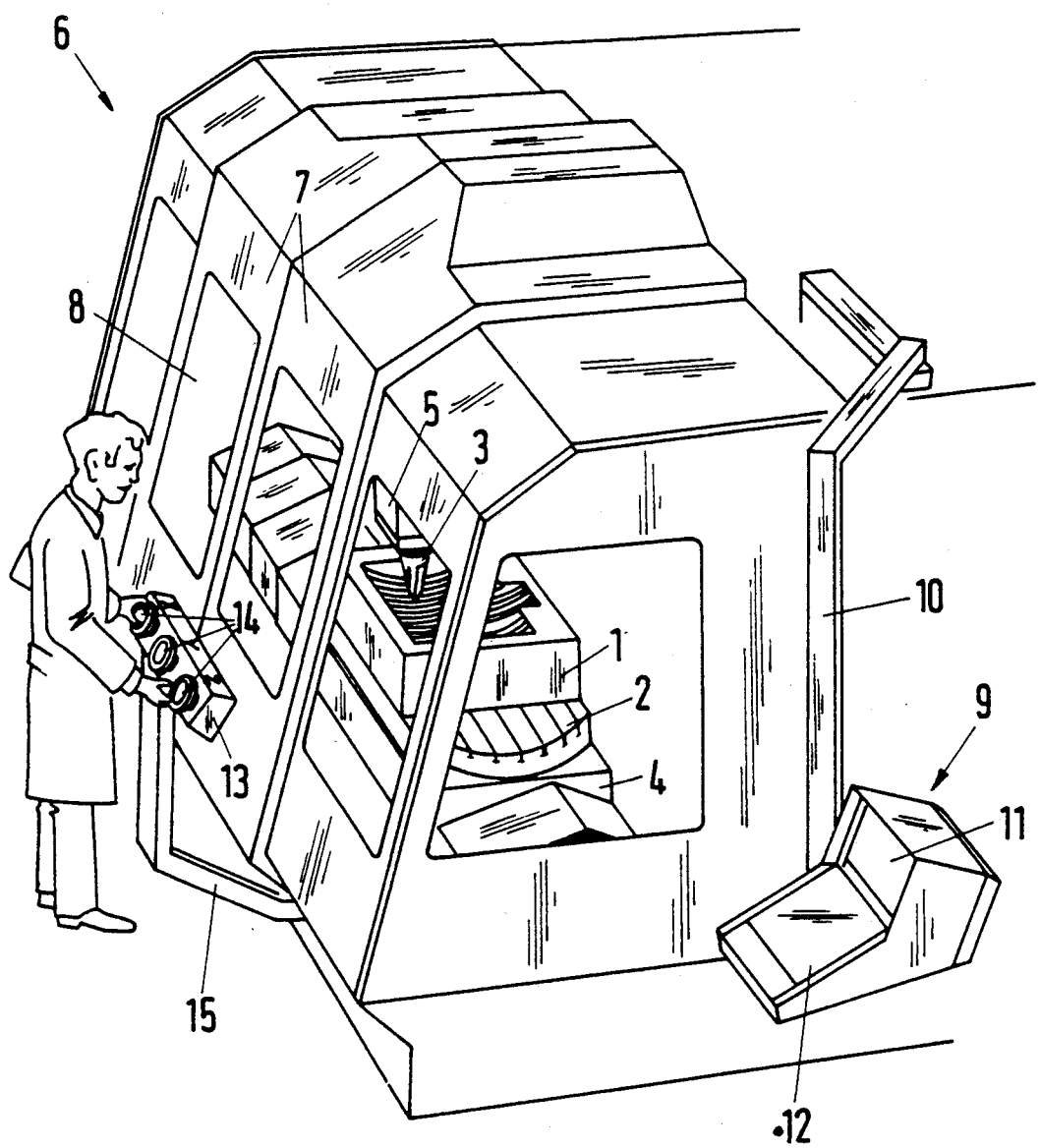
FIG. 1 shows a machining center with a control panel that contains the control elements in a perspective view.

The machine tool diagrammed in FIG. 1 is a machining center for producing a relatively large female mold. The workpiece 1 to be machined is clamped in the usual way on a workpiece table 2 and is machined by a vertical milling cutter 3. The feed movements of workpiece table 2 as well as the feed movements and adjustment movements of cutting tool 3 in the various coordinate axes are generated by drive motors (not shown) which are mounted in the traditional way on the machine foundation 4 or on machine stands and are connected to the workpiece table 2 and milling head 5 by means of linear roller guides, belt drives, etc. A safety compartment 6 contains sliding doors 7 on the front with one window 8 each, permitting visual observation of the workpiece machining. A control panel 9 that belongs to the program control unit (not shown inn FIG. 1) is connected by an articulated spar assembly 10 to the compartment frame or another load-bearing structural part and contains a display screen 11 as well as a keyboard field 12. This control panel 9 can be moved by the operator out of its resting position as shown here into a better operating position which thus makes it possible for the operator to monitor the programmed operating sequences and optionally even intervene in the program.

A separate control panel 13 with a hand wheel 14 for each of the possible axes of coordination is provided for manual operation. The hand wheel can be moved out of its side resting position into the operating position shown here by means of a carrying structure with a pivot bar 12. In addition to controlling elements 14, which are shown here in the form of hand cranks, other components such as instruments or displays, emergency off switches, etc., can also be included in control panel 13. Furthermore, other carrying mounts for control panel 13 can also be designed, but they should permit easy access to this control panel, e.g., in the manner shown here.

FIG. 2 shows one of the manual control circuits for a feed motor 20 whose output shaft 21 acts on workpiece table 2 by way of spindle drive 22. Motor 20 is supplied with current from a current source by way of connections 25 over a switch block 23 and line 24. A current and voltage meter 26 is inserted into line 24 and is connected by line 27 to a controller 28. One output 29 of this controller 28 leads to a brake gear 30, which acts on shaft 31 of hand wheel 14 and on another component that is moved directly by the wheel. In the version shown here, a rotary position transducer 32 which acts as a distance meter and indicates the respective position of workpiece table 2 is connected to spindle drive 22. The output signals of this measurement transducer are sent by line 33 to program control unit 34. In addition to various machining sections 35 and 36 for the output signals of measurement transducer 32, for example, and the control for switch block 23 by way of line 37, program control unit 34 also contains a memory 38 that is connected by line 39 to controller 28.

The manual control unit describes above functions as follows:

When switching from automatic operation to manual operation by swinging control panel 13 into the position shown in FIG. 1, using switching devices (not shown here), a twisting movement of hand crank 14 leads to activation of a converter 40 that is connected to the shaft 31 of the hand crank and converts the rotational movement of shaft 31 into electric signals which are then sent over line 41 to program control unit 34. Switch block 23 is activated by appropriate output signals from the program control unit 34 and feed motor 20 is started up. In this process, the power generated by motor 20 corresponds to the rotational movement of hand crank 14, with the result that workpiece table 2 travels at a suitably high rate of advance with a fast movement of the hand crank. The power generated by the motor is proportional to the current flow in line 24 and is picked up by sensor 26 which is designed as a current meter and sent over line 27 to controller 28. As soon as the motor power reaches or exceeds the given level, controller 28 generates output signals that act by way of output 29 to engage brake gear 30. This brake gear 30 then exerts an inhibiting force on shaft 31 of hand crank 14 that is proportional to the output of motor 20, and this gives the operator a feel for the load acting on workpiece 1 by the milling tool due to the increasing difficulty in turning hand crank 41. Due to the slowdown in turning the hand crank and thus the forward movement of the workpiece table, the power output of the motor and thus also the load on the workpiece can be reduced.

Instead of or in addition to current sensor 26, a torque meter 42 can also be connected to output shaft 21 of motor 20 or to some other driven component whose output signals are sent via line 43 to controller 28 in order to detect a power parameter of motor 20. Similarly, instead of brake gear 30 which is controlled by controller 28, a motor 44 that acts like it and is driven by an output 45 of controller 28 and acts on shaft 31 of hand crank 14 may also be provided.

In order to avoid exceeding a given end position of workpiece table 2 in accordance with the shape of the finished female mold, regardless of the effect of brake gear 30 and motor 44 described above, data for the end positions of workpiece table 2 for any machining operation executed in manual operation are input into memory 38 of program control 34. As soon as the measurement generator which is on the shaft 31 of hand crank 14 in the version shown here but could also be provided at another suitable location, e.g., on workpiece table 2 or in the area of the drive spindle, indicates that the workpiece table has reached the vicinity of this given end position, the program control unit sends a signal over line 39 to controller 28, thereby completely engaging brake gear 30 and thus necessarily stopping shaft 31. This also prevents drive motor 20 from continuing to run. A similar effect can also be achieved when corresponding cutoff signals are sent by program control unit 34 to switch block 23.

This invention is not limited to the practical examples described above. For example, the connection of output power of motor 20 to an element that permits proportional control of the twisting movement of hand crank 14 can also be accomplished by means of hydraulic control devices. In addition, the concept according to this invention can also be implemented with machine tools with simpler NC controls, in which case the sections integrated into program control unit 34 in the practical example shown here could be replaced by separate component groups.

I claim:

1. A control system for a program-controlled machine tool including a feed motor that is linked to a program control unit which automatically controls an operation of the feed motor for powering a moving machine part in accordance with a control program, said control system comprising:
   - a control circuit operatively connected to the feed motor of the program-controlled machine tool;
   - a switching element operatively connected through said control circuit to the feed motor for manually activating the feed motor, said switching element including a manually adjustable control element;
   - a sensor operatively connected to the feed motor for detecting a power parameter of the feed motor and generating an output signal proportional to said power parameter;
   - a brake gear operatively connected to said switching element and to said sensor, said brake gear being responsive to an output signal from said sensor for applying a resistive force to said manually adjustment control element, said resistive force being proportional to the power parameter of the feed motor to provide a physical indication at said manually adjustable control element of a load on the feed motor.

2. The control system of claim 1, further including a control panel which is positionable in front of a working area of the program-controlled machine tool, and wherein said manually adjustable control element includes a hand wheel arranged on said control panel.

3. The control system of claims 1 or 2 wherein said control circuit includes a data storage device containing data representing predetermined end positions of the moving machine part for a selected machining operation, said control circuit further including means for generating a blocking signal to the feed motor to prevent the moving machine part from moving beyond the preselected end positioned defined by the data stored in the data storage device.

4. The control system of claim 3, wherein said data storage device contains data representing a three-dimensional curve defining a surface of a finished machine work piece disposed on the program-controlled machine tool.

5. The control system of claim 1, wherein said sensor is connected to said brake gear through a controller that controls said brake gear and wherein said sensor detects an operating current provided to the feed motor.

6. The control system of claim 1, wherein said sensor includes a torque meter positioned to sense an output shaft torque of the feed motor.

7. The control system of claim 1, further including a distance meter operatively connected between said control circuit and the moving machine part for detecting a feed position of the moving machine part.

* * * * *